No. 705,163. Patented July 22, 1902.
C. N. TROOIEN.
DRAFT EQUALIZER.
(Application filed Feb. 24, 1902.)
(No Model.) 2 Sheets—Sheet 1.
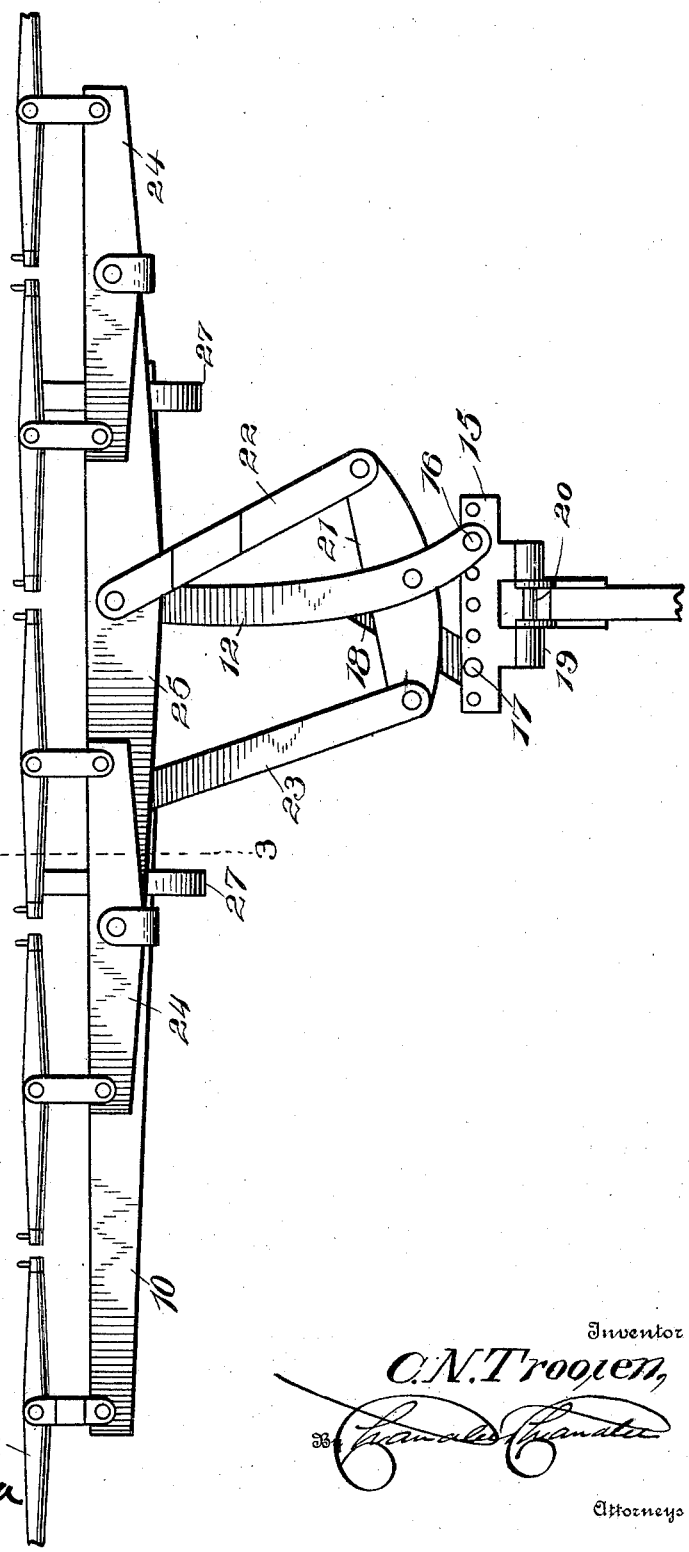
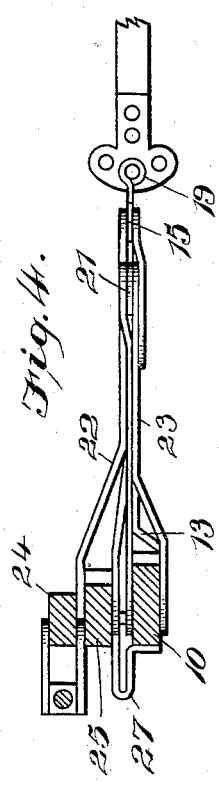

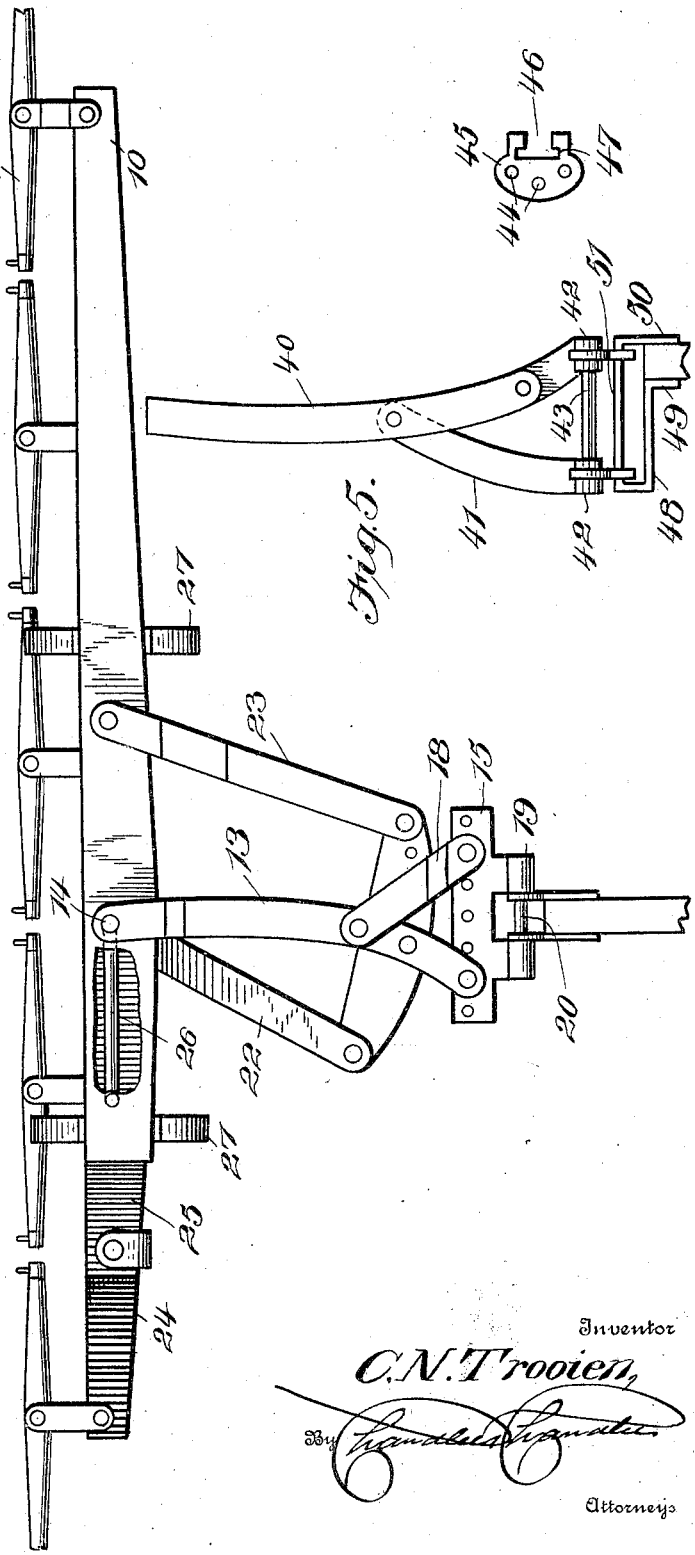
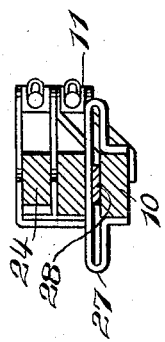

UNITED STATES PATENT OFFICE.

CORNELIUS N. TROOIEN, OF HENDRICKS, MINNESOTA.

DRAFT-EQUALIZER.

SPECIFICATION forming part of Letters Patent No. 705,163, dated July 22, 1902.

Application filed February 24, 1902. Serial No. 95,361. (No model.)

*To all whom it may concern:*

Be it known that I, CORNELIUS N. TROOIEN, a citizen of the United States, residing at Hendricks, in the county of Lincoln, State of Minnesota, have invented certain new and useful Improvements in Draft-Equalizers; and I do hereby declare the following to be a full, clear, and exact description of the invention, such as will enable others skilled in the art to which it appertains to make and use the same.

This invention relates to draft-equalizers; and it has for its object to provide a construction, including a system of levers, so constructed and connected as to distribute the draft of a single horse to balance the draft of four other horses, a further object of the invention being to provide a construction which is simple and cheap of construction and efficient in operation and wherein the parts may be readily adjusted to balance different values.

Other objects and advantages of the invention will be understood from the following description.

In the drawings forming a portion of this specification, and in which like numerals of reference indicate similar parts in the several views, Figure 1 is a top plan view of the equalizer. Fig. 2 is a bottom plan view of the equalizer, a portion of the main lever being broken away. Fig. 3 is a section on line 3 3 of Fig. 1 looking toward the outer end of the main lever. Fig. 4 is a section on line 3 3 of Fig. 1 and looking in the opposite direction from Fig. 3. Fig. 5 is a view showing a modified form of main draft-iron with its clevis attachments for connection with a plow-beam.

Referring now to the drawings, there is shown a draft-equalizer comprising a main beam or lever 10, at one end of which is attached a singletree 11 for attachment of a single horse the draft of which is to be balanced against the draft of four other horses.

The main draft-iron consists of an upper plate 12 and a lower plate 13, the latter of which is downwardly offset at one end to lie against the under face of the lever 10, while the adjacent end of the other plate lies against the upper face of the lever, the two plates being pivoted to the lever by the bolt 14. The main draft-iron is arcuate, and its free end curves away from the end of the main lever to which the singletree is attached, and between the plates of the main draft-iron and at the free end of the latter is disposed a plate 15, held in such position by means of the bolt 16, passed through the several plates. The plate 15 has a series of perforations therethrough, and engaged with a perforation at the opposite end from the main draft-iron is a bolt 17, which engages also a link 18, which in turn is bolted to the main iron at a point substantially midway of its length. At the opposite edge of the plate 15 from its line of perforations are ears 19, through which is engaged a bolt 20, adapted to engage the perforations of a clevis at the end of a plow-beam.

In connection with the equalizer there is employed a doubletree, and between the plates of the main draft-iron there is pivoted a lever 21, adjacent to the plate 15, said lever 21 being connected at one end with the central portion of the doubletree by means of the link 22, while the opposite end of lever 21 is connected to the main lever 10 by the link 23 at a point between the main draft-iron and the singletree and near to the draft-iron, the exact position being determined by the number and strength of horses to be hitched to the doubletree.

In the present instance a doubletree 24 is shown pivoted to each end of the doubletree 25, hereinbefore referred to.

To prevent the doubletree 25, which is the main doubletree, from lateral displacement from an efficient operative position, a link 26 is provided, one end of which is turned laterally and is pivotally engaged with the doubletree 25 at the point of connection of the link 22, while the opposite end of the link 26 is bent laterally in the opposite direction and is pivotally engaged with the end of the main lever 10 opposite to the singletree. This link 26 permits of movement of the main doubletree forwardly, but prevents its displacement laterally, as above mentioned. Excessive movement of the main doubletree forwardly beyond the main lever 10 is prevented by the loops 27, which are secured to the main lever and extend laterally thereof and beyond its front and rear edges, these loops being slidably engaged with cleats 28, secured longitudinally of the under side of the main doubletree.

In Fig. 5 of the drawings there is shown a modification of the main draft-iron and its clevis connections. In this construction the main iron is shown at 40, and pivoted thereto adjacent to its rear end is the link 41 of a length sufficient to reach to the rear end of the iron. The ends of the iron and link are provided with spaced and laterally-perforated ears 42, formed by bending tongues into cylindrical form, and engaged with the perforations of the ears is a pin 43 for engagement with the perforations 44 of clevis-plates 45, each of which has a vertically-extending series of perforations. The clevis-plates have their rear ends slotted, as shown at 46, and at the inner ends of the slots are the notches 47 in the sides of the slots, and in these notches are engaged the side edges of a strap-iron 48, which is bent to form the spaced members 49 and 50 for attachment to the sides of the plow-beam and the connecting-web 51, which is the portion engaged with the notches of the clevis-plates.

It will be understood that in practice modifications of the constructions shown may be made and that any suitable materials and proportions may be used for the various parts without departing from the spirit of the invention.

What is claimed is—

1. A draft-equalizer comprising a main lever having means for hitching an animal at one end thereof, a draft-iron attached to the lever adjacent to its opposite end and having a lever pivoted thereto and extending at opposite sides thereof connections between the first lever and one end of the second lever, a doubletree connected with the opposite end of the second lever, and a link pivoted to the first-named lever and to the doubletree and extending normally longitudinally thereof.

2. A draft-equalizer comprising a main lever having a singletree connected at one end thereof, a draft-iron pivoted to the lever adjacent to the opposite end thereof and having a lever pivoted thereto and projecting at opposite sides of the iron, a link pivoted to the main lever and to one end of the second lever, a doubletree, a link pivoted to the doubletree and to the second end of the second lever, a link pivoted to the doubletree and to the end of the main lever opposite to the singletree, loops connected to and projecting laterally beyond the main lever, and cleats upon the doubletree and with which the loops are slidably engaged.

In testimony whereof I affix my signature in presence of two witnesses.

CORNELIUS N. TROOIEN.

Witnesses:
E. A. CHRISTENSEN,
THEO. OSHOOT.